(No Model.)
E. E. TOPE & R. W. GARTRELL.
SAWING MACHINE.
No. 581,183.  Patented Apr. 20, 1897.
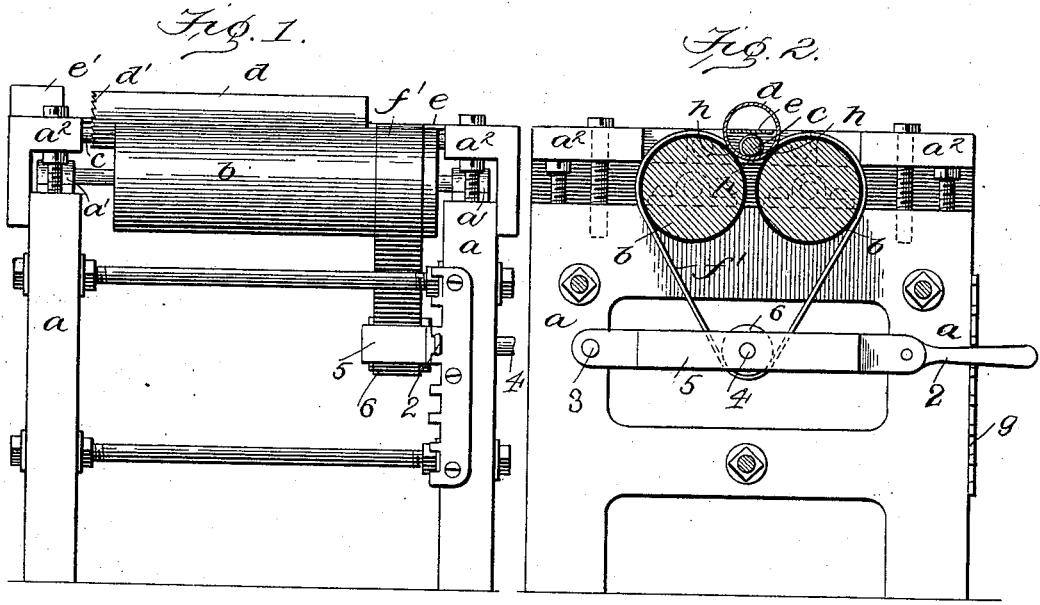
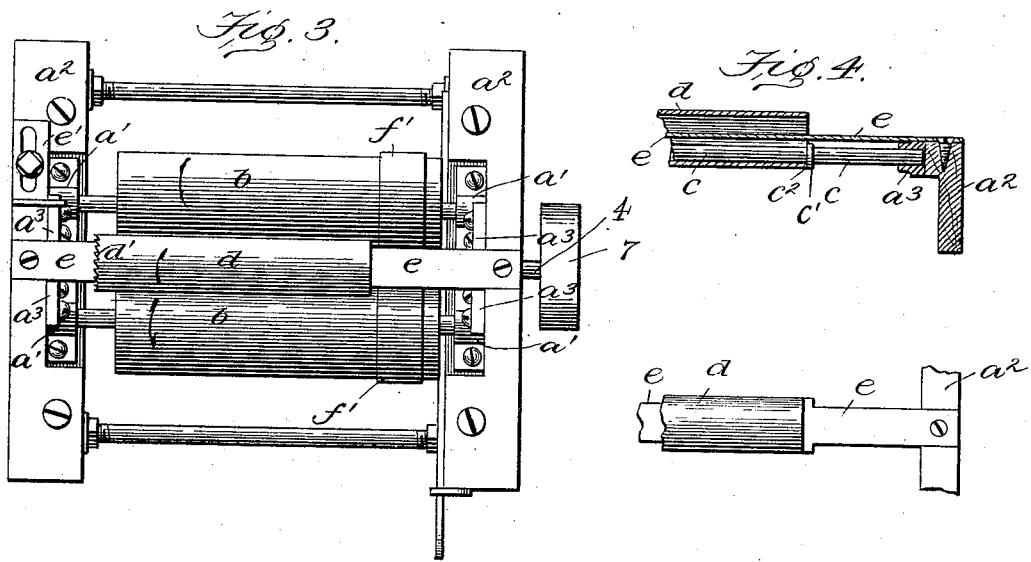
WITNESSES:
Edwin L. Bradford
E. Wade Ball
INVENTORS
Remus W. Gartrell
Enro E. Tope
BY
R. S. & A. B. Lacey
ATTORNEYS
THE NORRIS PETERS CO., PHOTO-LITHO., WASHINGTON, D. C.

UNITED STATES PATENT OFFICE.

EZRA E. TOPE AND REMUS W. GARTRELL, OF LEESVILLE, OHIO.

SAWING-MACHINE.

SPECIFICATION forming part of Letters Patent No. 581,183, dated April 20, 1897.

Application filed August 11, 1896. Serial No. 602,444. (No model.)

*To all whom it may concern:*

Be it known that we, EZRA E. TOPE and REMUS W. GARTRELL, of Leesville, in the county of Carroll and State of Ohio, have invented certain new and useful Improvements in Sawing-Machines; and we do declare the following to be a full, clear, and exact description of the invention, such as will enable others skilled in the art to which it appertains to make and use the same, reference being had to the accompanying drawings and the letters and numerals of reference marked thereon, similar letters and numerals indicating corresponding parts in all the figures which form a part of this specification.

Our invention relates to improvements in woodworking machinery, and is essentially a cylinder rip-saw, useful in the manufacture of certain moldings, troughs for the eaves of houses, &c.; and it consists in the construction, combination, and arrangement of the several parts hereinafter described and claimed.

In the drawings forming a part of this specification, Figure 1 is a front elevation of the improvement. Fig. 2 is an end view of the same. Fig. 3 shows the revolving parts, and the arrows indicate the direction of the rotary motion. Fig. 4 is an end view of the revolving spindle and saw.

In describing our invention $a$ is a suitable frame holding the adjustable bearings $a'$ $a'$ to receive the journals of the rollers $b$ $b$. The bars $a^2$ $a^2$, carrying the adjustable bearings $a^3$ $a^3$, rest upon set-screws and may be raised or lowered thereby and adjusted to suit saws of different diameters.

$d$ is a hollow metal cylinder with open ends, provided at one extremity with or formed into saw-teeth $d'$.

$c$ is a metal spindle passing longitudinally within and through the hollow saw $d$ and into the adjustable bearings $a^3 a^3$. It is also provided with a flange $c'$, which revolves with it and against which the saw $d$ rests at $c^2$ when the device is in motion, or to serve the same purpose of preventing the saw $d$ from impinging upon the belt $f'$ a shoulder may be formed on the parting-strip $e$.

$b$ and $b$ are rollers which may be constructed of wood, metal, or other substance and covered with rubber or leather, if found desirable. They are made to project to the rear of the saw $d$ sufficient to afford pulley-surface for the belt $f'$ and journaled in the adjustable bearings $a'$ $a'$.

The spindle $c$ is made to revolve with the same peripheral rapidity as the rollers $b$ $b$, but in an opposite direction, by means of the belt $f'$, as shown.

The spindle $c$ would revolve irregularly from friction imparted by the saw $d$ when in motion, but by means of the belt $f'$ and the motion thereby imparted it supplies part of the force necessary to drive the saw $d$.

The rollers $b$ $b$, when placed as shown in Fig. 2 and their external surface made to engage the saw $d$ and connected by the belt $f$, passing around their outer and under surface, will be given a rotary motion when power is applied by the belt $f$. The rollers $b$ $b$ will impart a rotary motion to the saw $d$, and by means of the belt $f'$ a like rotary motion to the spindle $c$. If by means of the adjustable bearings $a^3$ $a^3$ we increase the pressure or friction up to a certain amount at the points of contact $h$ $h$ $h$, it is evident that we will increase the power or force of the revolutions of the hollow cylinder $d$.

In practical operation the spindle $c$ should be somewhat less than one-half the inside diameter of the cylinder-saw $d$, and if saws of several inches in diameter are used the spindle $c$ may take the form of a roller.

$e$ is a horizontal parting-strip passing longitudinally within and through the hollow cylinder-saw $d$ and serves both as a lumber-guide and to prevent the bars of lumber pressing upon the spindle $c$.

$e'$ represents guides for the bars of lumber, attached to the frame $a$.

An engagement-lever 2 is pivoted on the inside of the framework $a$ by the pivot-pin 3 and has the shaft 4 journaled in the said lever and the bracket 5, said bracket secured to the said lever, as shown. A band-wheel 6 is keyed on the said shaft and has the belt $f'$ working therearound, the purpose of the said band-wheel being to impart motion to the said belt $f'$. Motion is imparted to the band-wheel 6 by means of the second band-wheel 7, keyed on the outer end of the shaft 4. The said band-wheel 7 is operated in any suitable manner. By means of the said lever 2 the band-wheel 6 is thrown into and out of engagement with the band $f'$. A rack 9 is provided, as shown, and engages with the end of the said operating-lever 2 and serves to keep the said lever hard down.

Having thus fully described our invention, we claim as new and desire to secure by Letters Patent—

In a sawing-machine, the combination of a framework, $a$, adjustable bearings, $a'\ a'$, situated on the said framework and adapted to receive the journals of the rollers, $b\ b$, the rollers $b\ b$, the saw, $d$, movable bars, $a^2\ a^2$, carrying the adjustable bearings, $a^3\ a^3$, a parting-strip, $e$, secured at each end to the movable bars, $a^2\ a^2$, and passing through the cylindrical saw, $d$, a spindle $c$ passing through the said cylindrical saw and working in the adjustable bearings, $a^3$, $a^3$, a lever, 2, pivoted to the said frame, $a$, a series of band-wheels and the belt $f'$ in operating contact with said rollers $b\ b$ and spindle $c$, substantially as set forth and arranged.

In testimony whereof we affix our signatures in the presence of two witnesses.

EZRA E. TOPE.
REMUS W. GARTRELL.

Witnesses:
J. H. MOORE,
WM. ADAIR.